United States Patent [19]

Lemley et al.

[11] Patent Number: 4,671,465

[45] Date of Patent: Jun. 9, 1987

[54] METHOD AND APPARATUS FOR WINDING SLOTTED ARMATURES

[75] Inventors: Thomas H. Lemley, Media, Pa.; Dennis G. Overdorf, Geneva, Ind.; Kenneth A. Ott, Ludlow Falls; Valentine J. Kozak, Dayton, both of Ohio

[73] Assignee: Kollmorgen Corporation, Simsbury, Conn.

[21] Appl. No.: 713,850

[22] Filed: Mar. 20, 1985

[51] Int. Cl.$^4$ ........................................... H02K 15/085
[52] U.S. Cl. ...................................... 242/7.03; 29/598; 29/732; 242/7.05 C
[58] Field of Search .............. 242/1.1 R, 7.03, 7.05 R, 242/7.05 C; 29/596, 598, 732

[56] References Cited

U.S. PATENT DOCUMENTS

| | | | |
|---|---|---|---|
| 2,718,359 | 9/1955 | Hunsdorf | 242/7.05 C |
| 2,847,170 | 8/1958 | Lill et al. | 242/1.1 R |
| 2,875,508 | 3/1959 | Farmer | 242/7.05 C |
| 2,883,119 | 4/1959 | Braun | 242/7.05 R |
| 3,884,424 | 5/1975 | Bosquain et al. | 242/7.02 |
| 4,389,023 | 6/1983 | Eminger | 29/598 |

Primary Examiner—Billy S. Taylor
Attorney, Agent, or Firm—Morgan & Finnegan

[57] ABSTRACT

An automatic armature winding machine that is capable of winding straight and skewed stack armatures of various diameters and lengths and of achieving high percentages of slotfill is disclosed. A transfer plate for directing a plurality of wires for winding the core of the armature to a winding area in preparation for the winding operation is mounted in translational relationship to the armature core to be wound. The wires within the concentration area are simultaneously wound into the slot of the armature core by moving the wires through the armature core so that the wires are forced into the slots of the armature core. Upon completing the first winding stroke, hydraulic actuated forming blocks are radially activated to push the wires further into the slots of the armature core to make space for the subsequent turns to be wound. Thereafter, the winding stroke is repeated by moving the wires back through the armature core, after which the blocking function is repeated. The number of turns provided by the machine is determined by the number of strokes of the transfer plate with respect to the armature core, and thus, the number of times that the wires move through the armature core.

9 Claims, 13 Drawing Figures

METHOD AND APPARATUS FOR WINDING SLOTTED ARMATURES

BACKGROUND OF THE INVENTION

The present invention pertains to winding machines, and in particular, to an automatic winding machine for winding electromechanical machine armatures.

Electromechanical machines such as motors are used in many applications, many of which require machines which are limited in size, yet which are capable of delivering a large amount of torque. Torque, which is the force, measure in foot pounds, exerted by a rotating shaft, is proportional to the amount of flux produced by the windings of a motor. This flux is, in turn, proportional to the cross-sectional area of the copper within the slots around the periphery of the motor's rotor. Thus, to provide a motor which is small in size, yet capable of delivering a large amount of torque, it is desirable to wind the motor's armature in a manner which maximizes slotfill, i.e., the percentage of the cross-sectional area of a slot that is filled with copper.

Machines for automatically winding armatures currently exist in the art. Such machines are typically complex in their mechanical operation and limited in the level of slotfill which they are capable of achieving. For example, one previous armature winding machine in the art requires 145 wire placing motions to wind an armature having 29 slots with five turns per coil. Similarly, the highest level of slotfill that has been achieved to date by a prior art automatic winding machine in winding a four pole winding is 45 percent slotfill.

SUMMARY OF THE INVENTION

Accordingly, it is a primary object of the present invention to provide an automatic winding machine which is capable of achieving significantly higher levels of slotfill in winding armatures, yet which is not overly complex in its mechanical operation.

It is another object of the present invention to provide an automatic winding machine of the foregoing type which is capable of winding a variety of armature stack diameters and lengths It is a further object of the present invention to provide an automatic winding machine of the foregoing type which can be quickly changed from winding armatures of one stack diameter and length to winding armatures of other stack diameters and/or lengths without major tooling changeovers.

It is yet another object of the present invention to provide an automatic armature winding machine of the foregoing type which is capable of winding skewed stack armatures without major tooling changeovers.

The present invention is an automatic armature winding machine which is capable of winding a variety of straight and skewed stack armatures of varying diameters and lengths with a minimal amount of change in tooling set-up, yet which is simple in mechanical operation, requiring only a limited number of wire placing motions equal to the number of turns to be wound onto a core of a given armature. According to the present invention, a coil transfer plate guides a plurality of wire coils to be used in winding the core of an armature to a winding area for the winding operation. Mounted in translational relationship to this transfer plate is the armature core to be wound. It is held in proper angular orientation with respect to the coils of wire positioned in the winding area by a collet locking mechanism and detent rings mounted adjacent to the wire guide tooling. To perform the winding operation, all of the wires within the winding area are simultaneously inserted into the slots of the armature core by moving them through the armature core. This winding stroke is accomplished by means of a DC servo actuated ball screw assembly which translates the coil transfer plate and detent rings along a path parallel to the axis of the armature so that the wires in the winding area are forced into the slots of the armature, the detent rings holding the wires in place during each stroke. Upon completion of each winding stroke, a DC servo actuated gear train indexes the armature core for proper coil span by rotating it a selected number of degrees. In addition, after each indexing turn hydraulic actuated forming blocks are radially activated to form end turns back toward the centerline of the core, and to force the previously wound wires deeper into the slots of the armature core to make space for the subsequent turns to be wound. Thereafter, the winding stroke is repeated until the required number of turns has been wound. Thus, the number of turns performed by the machine is determined by the number of strokes of the transfer plate with respect to the armature core. Where paper slot linings in the armature core are not glued into the core's slots, they are held in place and out of the path of the incoming wires during the winding stroke by means of paper guide blades which are first inserted into the armature core slots during each winding stoke. Where the paper slot linings are glued into the core's slots, the paper guide blades still serve to ensure that the paper linings are out of the way of the incoming wires during the winding stroke.

THE DRAWINGS

DESCRIPTION OF THE PREFERRED EMBODIMENT

Figure 1:
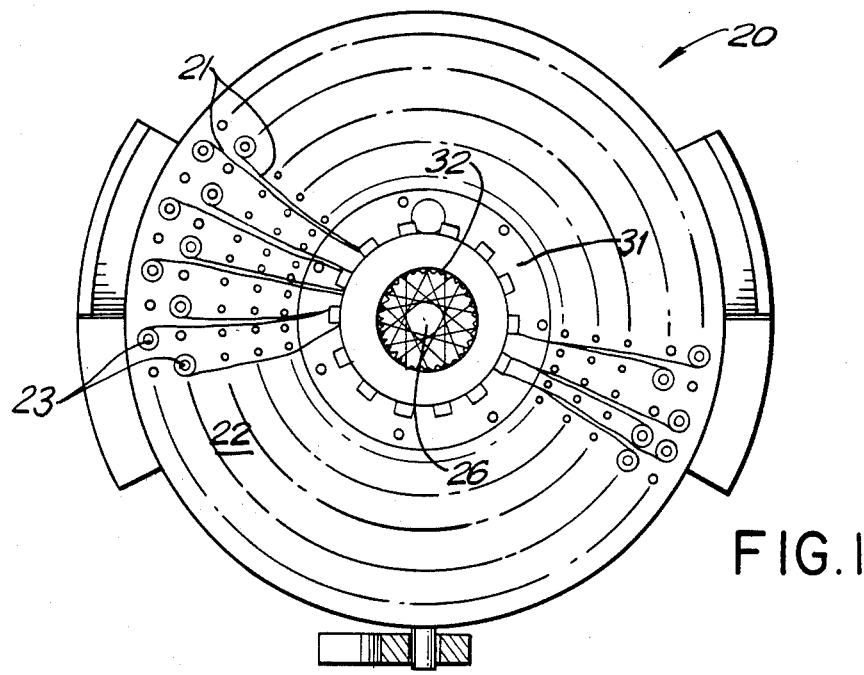
FIG. 1 is a plan view of the coil transfer plate.

FIG. 1 is a plan view of a coil transfer plate 20 used in the preferred embodiment of the present invention to load and guide to a winding area a plurality of wires 21 which are used to wind a given armature. As can be seen in FIG. 1, coil plate 20 is generally circular in shape, and includes a circular loading area 22 in which are mounted a plurality of coil pins 23 over which coils of wires 21 are slipped for unwinding. In the preferred embodiment of the invention there are a total of 106 coil pins 23 mounted in circular area 22.

Figure 4:
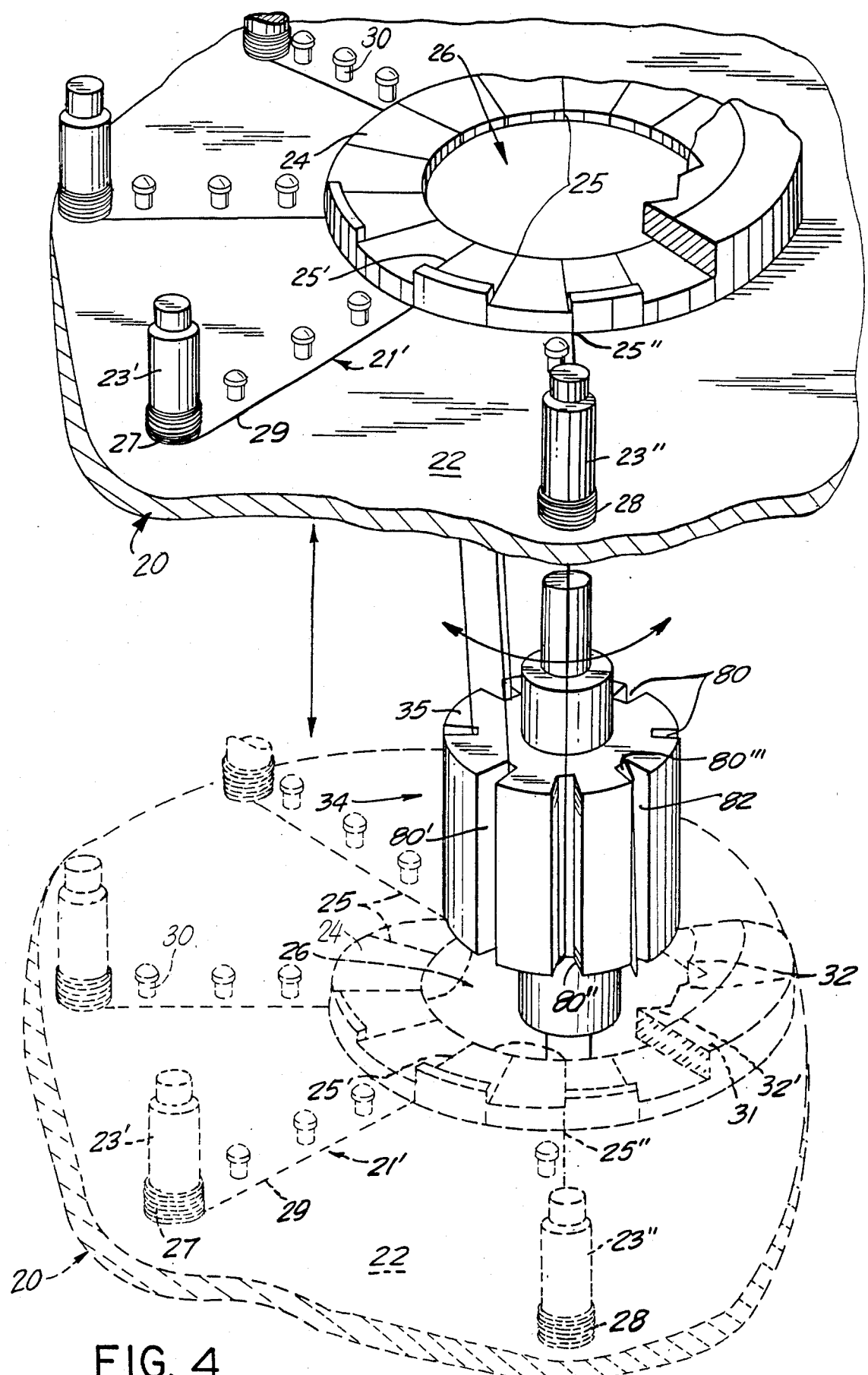
FIG. 4 is a perspective view, partly in phantom, showing by way of example a portion of an armature core being wound by a single wire.

Mounted in the center of coil plate 20 is a lower wire guide ring 24, best seen in FIG. 4, which is also circular in shape, and which includes a plurality of radially oriented slots 25 used to direct wires 21 to a winding area 26, located at the center of plate 20. Each wire 21, when loaded onto coil transfer plate 20, is comprised of a first coil 27 slipped over a first coil pin 23', a second coil 28 slipped over a second coil pin 23" and an intermediate portion 29, running from first coil pin 23' through a first radial slot 25' of lower wire guide ring 24 into concentration area 26 and out again through a second radial slot 25" back to second coil pin 23".

Figure 3:
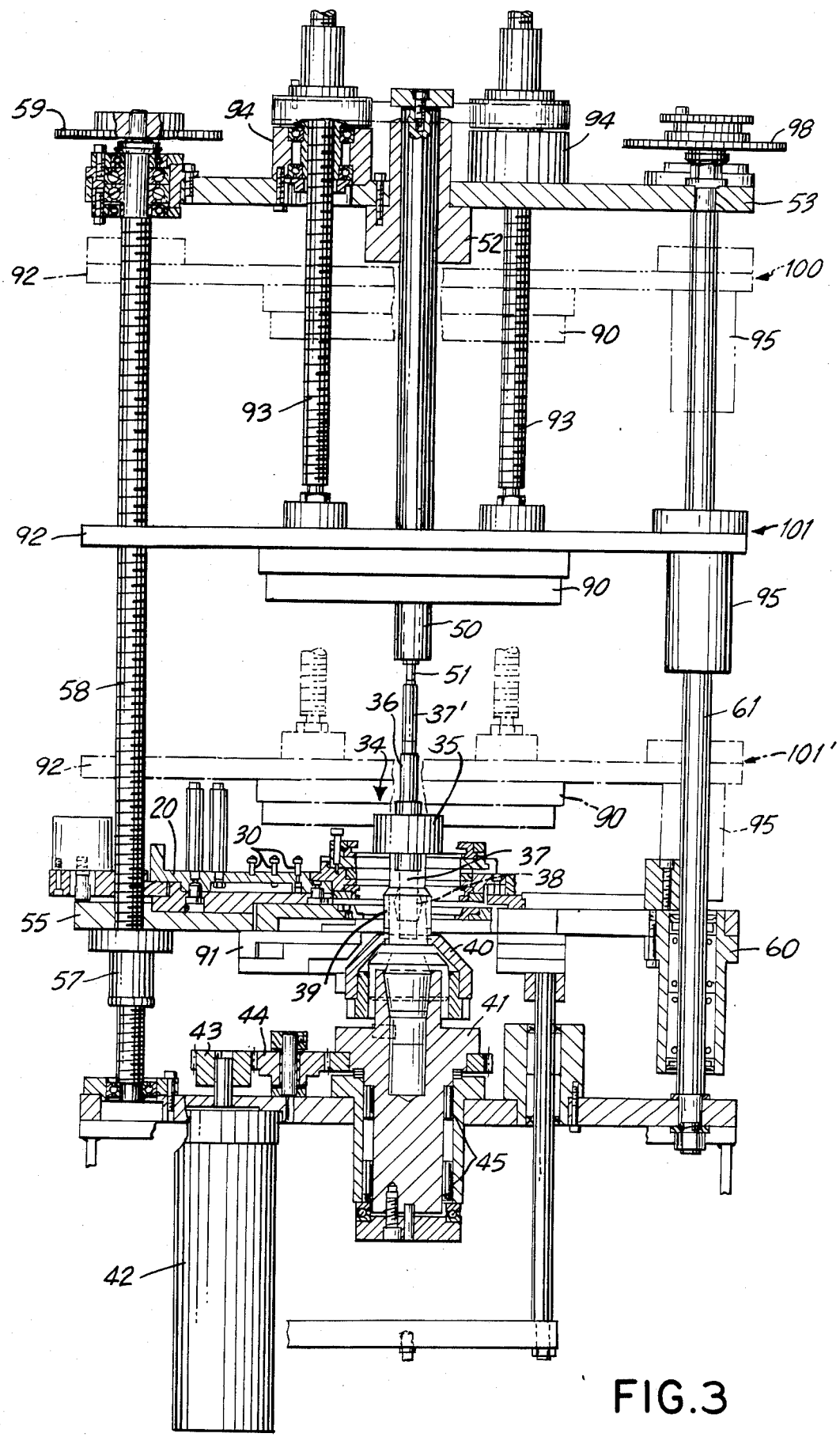
FIG. 3 is a side elevational view, partly in section and partly in phantom, of the automatic armature winding machine shown in FIG. 2.

Also mountable in wire loading area 22 of plate 20 are a plurality of vertically oriented tensioning pins 30, shown in FIG. 3, which may be used to vary the feed tension of the wires 21 entering concentration area 26. By snaking each of the wires around a selected number of pins, the tension of each wire is held at a selected level as it unwinds from the coil pins into the winding area during the winding operation. It should be noted, however, that the use of tensioning pins 30 is not required for proper operation of the armature winding machine.

Seated on top of lower wire guide ring 24 is a second upper wire guide ring 31 provided with a plurality of paper guide blades 32 that engage the slot insulating paper typically used in the slots of armature cores. It should be noted that although the preferred embodiment shown in the accompanying drawings uses upper wire guide ring 31, this guide would not be absolutely necessary where the insulating paper is glued into the slots of the armature core.

Figure 2:
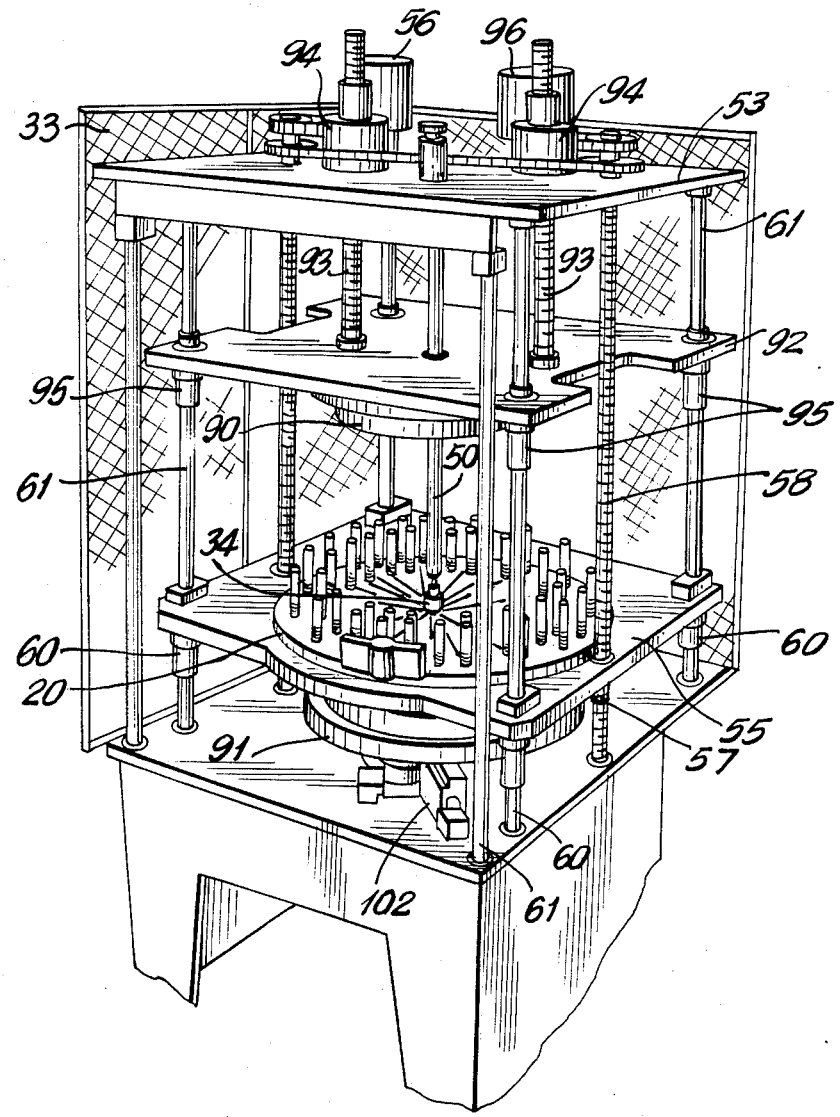
FIG. 2 is a partial perspective view of the preferred embodiment of the automatic winding machine of the present inVention.

Referring now to FIGS. 2 and 3, shown therein are a partial perspective view and a side elevational view, partially in section and partially in phantom, respectively, of the armature winding machine of the present invention. As shown in FIG. 2, the armature winding machine is surrounded by a safety gate 33, one side of which is not shown to allow easy viewing of the machine's components. Also shown in FIGS. 2 and 3 is an armature 34 which is to be wound by the winding machine. Armature 34 is comprised of an armature core 35 and a shaft 36 comprised of a bottom section 37 and a top section 37', both extending axially from the core in opposite directions. It should be noted that armature 34 can be of any size stack length or diameter within a range of sizes which the machine is designed to accommodate.

To perform the winding operation, armature 34 is loaded into the winding machine by inserting its bottom section 37 into a collet 38. The function of collet 38 is to generally support the armature and maintain its angular position with respect to wireguide slots 25 of lower wire guide ring 24. Collet 38 is surrounded by an upper collet housing 39, which exerts pressure on collet 38 to lock the armature in position. For this purpose, collet, 38 has an axially disposed compression slot which narrows and thereby causes increased holding pressure to be exerted on bottom section 37 as upper collet housing 39 is threaded down into position onto a collet adaptor 40. This adaptor is used only for applications in which the armature has a small diameter shaft. It, in turn, is threaded onto a lower collet housing 41 which is rotated to lock collet 38 onto the bottom section of the armature shaft. Lower collet housing 41 is designed to accomodate the larger diameter shafts of certain armatures which the machine is designed to wind. For these applications collet adaptor 40 is removed to allow a larger collet and a larger upper collet housing, capable of accommodating the larger diameter armature shafts, to be threaded directly onto lower collet housing 41.

Figure 7:
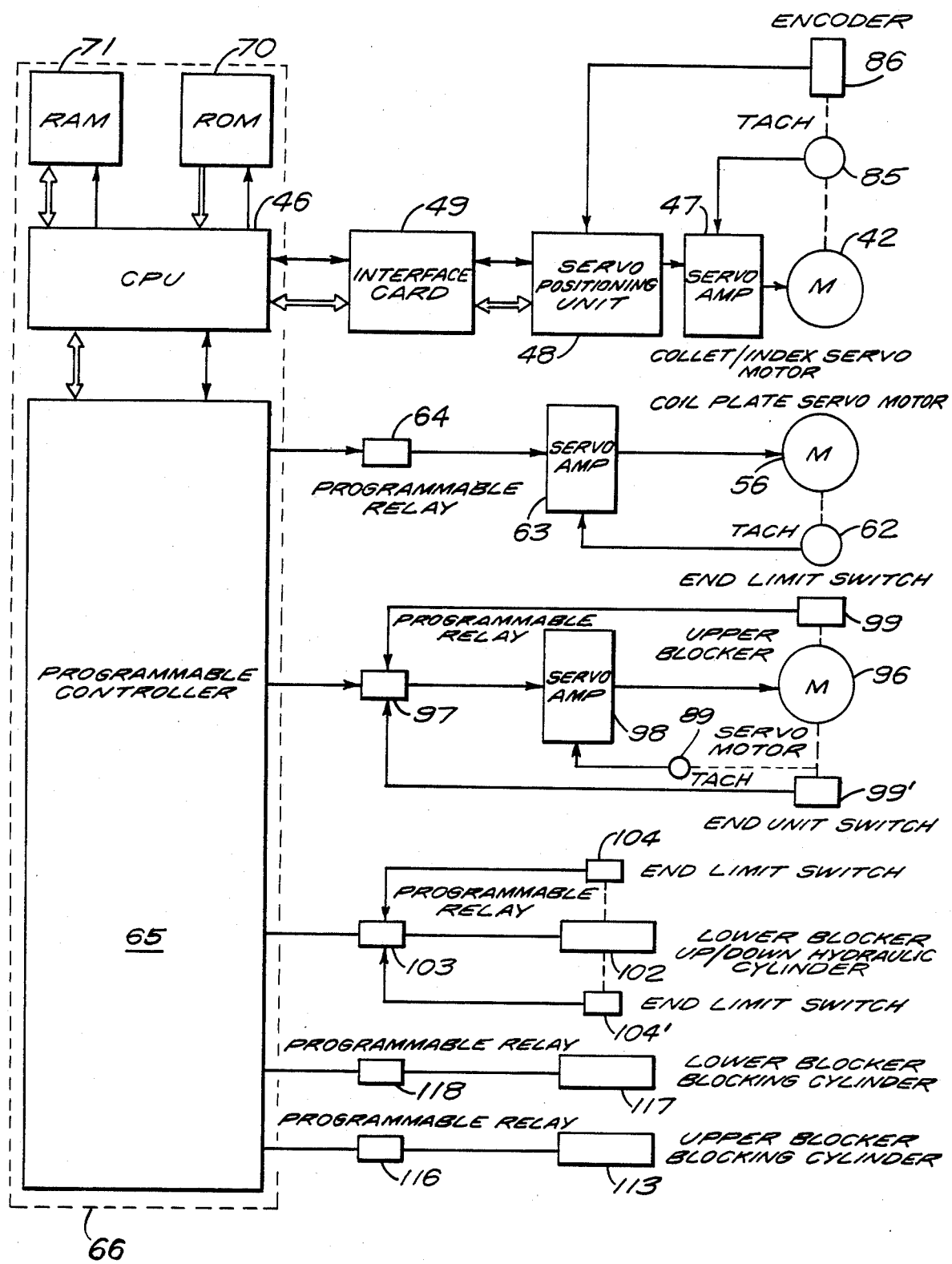
FIG. 7 is a block diagram of the control circuit for the automatic armature winding machine.
Figure 8:
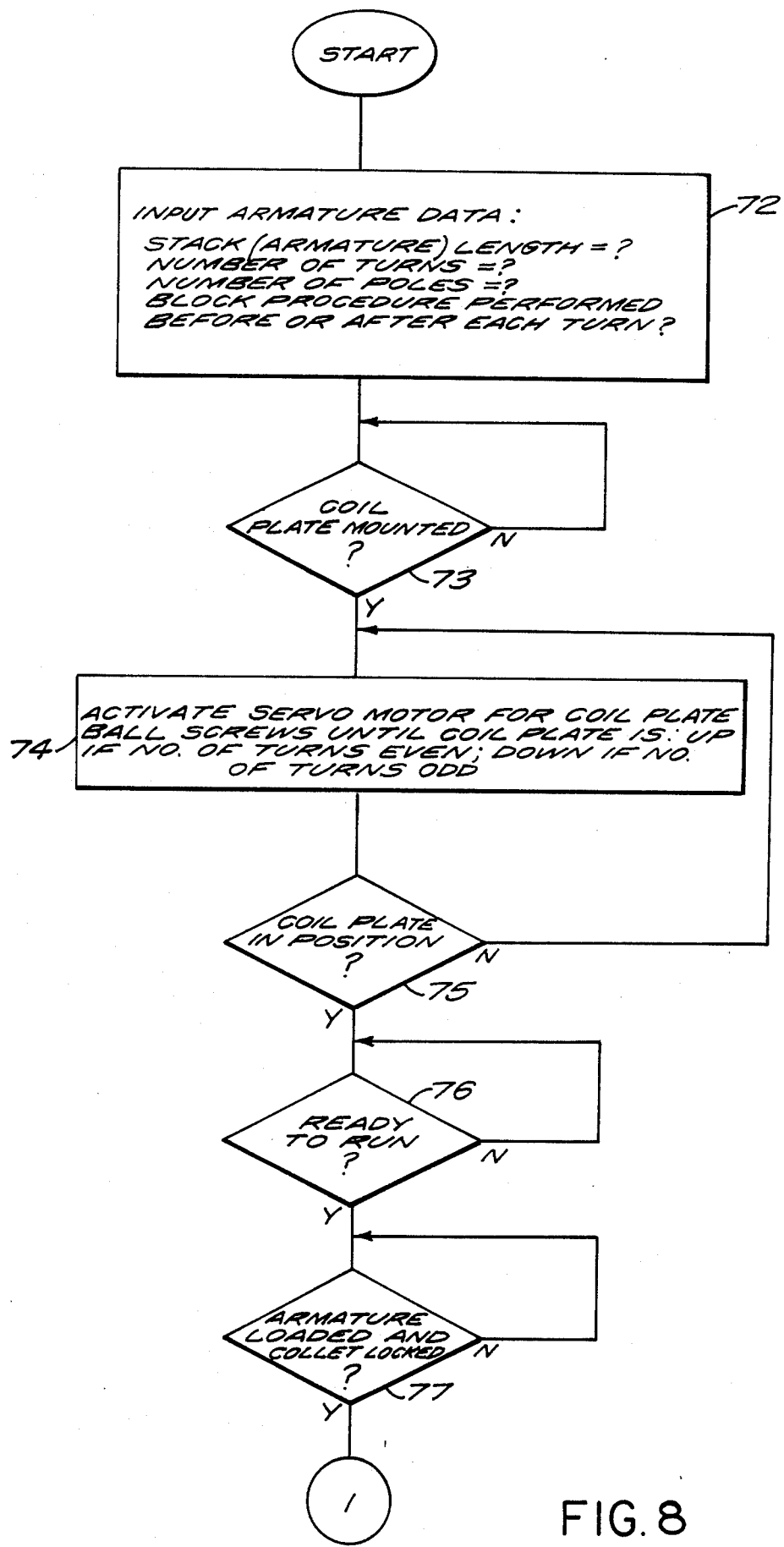
FIGS. 8 through 12 are a flow chart of the steps performed by the armature winding machine in winding an armature core.

Referring now to FIG. 7 in combination with FIGS. 2 and 3, the locking of collet 38 is performed automatically by a DC servo actuated gear train which rotates lower collet housing 41 until collet 38 is locked into position. For this purpose, a DC servo motor 42 is activated to turn a drive gear 43 and idler gear 44 meshed therewith to rotate lower collet housing 41 until the collet adaptor is threaded home and collet 38 locked against bottom section 37. Lower collet housing 41 is supported by a plurality of roller bearings 45 for easy rotation.

The operation of DC servo motor 42 is controlled by a central processing unit (CPU) 46 which is the heart of the circuit that controls the overall operation of the wire winding machine of the present invention. Driving servo motor 42 is a servo amplifier 47 which, in turn, is driven by a servo positioning unit 48 connected to CPU 46 through an interface card 49. During the collet locking operation servo motor 42 is rotated until its stall torque is reached, at which point servo amplifier 47 senses an overcurrent condition, causing it to shut down motor 42. This stall torque level is sufficient to lock collet 38 into position.

In the preferred embodiment of the present invention, CPU 46 is part of a microcomputer, model no. 5TI manufactured by Texas Instruments Corp., while servo positioning unit 48 and interface card 49 comprise a single digital unit model no. 271-1A manufactured by Delta Tau Systems.

Positioned concentrically above armature 34 is a line center support 50 which works in conjunction with the previously described lower collet assembly to hold armature 34 in position during the winding operation. Protruding from the lower end of support 50 is an axially disposed pin 51 which engages the top of shaft 36. Because the length of top section 37' of shaft 36 varies with the size of armature 34, the line center support is designed to shift up and down to accommodate various length shafts. Once support 50 has been positioned, a bearing and locking assembly 52, mounted below a support plate 53 positioned at the top of the machine, holds support 50 in position.

Referring again to FIG. 3, coil transfer plate 20, shown partially and in section therein, is loaded into the winding machine for the winding operation and locked onto a horizontally disposed support platform 55, which is translatably mounted with respect to armature 34 to allow the coils of wire 21 concentrated in area 26 to be moved through armature core 35 to perform the winding operation. Depending on whether the number of turns to be wound is odd or even, coil transfer plate 20 is loaded into the winding machine either before the armature to be wound or after it, respectively. In the latter instance, the coil transfer plate is passed over the top section of the shaft of armature 34, and then locked onto support platform 55.

Platform 55, and thus, coil plate 20, are translated with respect to armature 34 by means of a gear and ball screw assembly activated by a DC servo motor 56 (FIG. 7). Mounted under each side of platform 55 is a lead screw assembly 57 through which a ballscrew 58 is threaded and caused to rotate to translate platform 55 and transfer plate 20 up or down over armature 34. Rotating each of ballscrews 58 is a drive gear 59 which is driven by a gear arrangement (not shown) coupled to the shaft of coil plate DC servo motor 56.

Positioned at each of the four corners of support plate 55 is a linear bearing assembly 60, each of which tracks a vertically disposed linear bearing guiderod 61 during translations of support plate 55.

Positioning of support plate 55, and thus coil transfer plate 20 is velocity controlled by means of a tachometer 62 (FIG. 7), mounted on the end of the shaft of motor 56, which feeds back a velocity signal to a servo amplifier 63 driving this motor. Amplifier 63 is, in turn, actuated by a programmable relay 64 that is switched on and off by a programmable controller 65 controlled by CPU 46. In operation, CPU 46 controls programmable controller 65 by telling the coils of wire into the slots of the armature. controller what functions are to be performed at what times. In the preferred embodiment of the present invention programmable controller 65 is a model no. 5TI Sequencer manufactured by Texas Instruments Corp.

Referring now to FIGS. 8 through 12, shown therein is a Flow Chart of the steps performed by the winding machine of the present invention during the winding of a typical armature coil. The program used by CPU 46 to carry out these steps is stored in a read only memory (ROM) 70 accessible by CPU 46. In operating the winding machine certain data regarding the armature to be wound are entered into the control circuit by a terminal (not shown) or other suitable means and stored in random access memory 71 for subsequent access by CPU 46. As shown in step 72 of FIG. 8 an operator first enters data consisting of stack (armature) length, the number of turns to be wound, the number of poles which the armature winding is to have and the blocking procedure to be used for pushing the coils of wire into the slots of the armature.

Once CPU 46 determines at step 73 that coil plate 20 has been properly mounted within the machine on support plate 55, it initializes the position of coil plate 20 to perform either an even or odd number of turns. As indicated at step 74 of FIG. 8 if the number of turns is even, servo motor 56 will be activated to move coil plate 20 to a position above the armature at the start of the winding sequence. Conversely, if the number of turns is odd, motor 56 will be activated to move the coil plate down to a position below armature 34, as shown in FIG. 3 of the drawings. Once CPU 46 has completed at step 75 initializing the position of the coil plate, it checks to see if the operator is ready to run at step 76. If the operator has given this indication to the CPU, it then checks to insure that the armature to be wound has been loaded and locked in by collet 38 (step 77).

Figure 6:
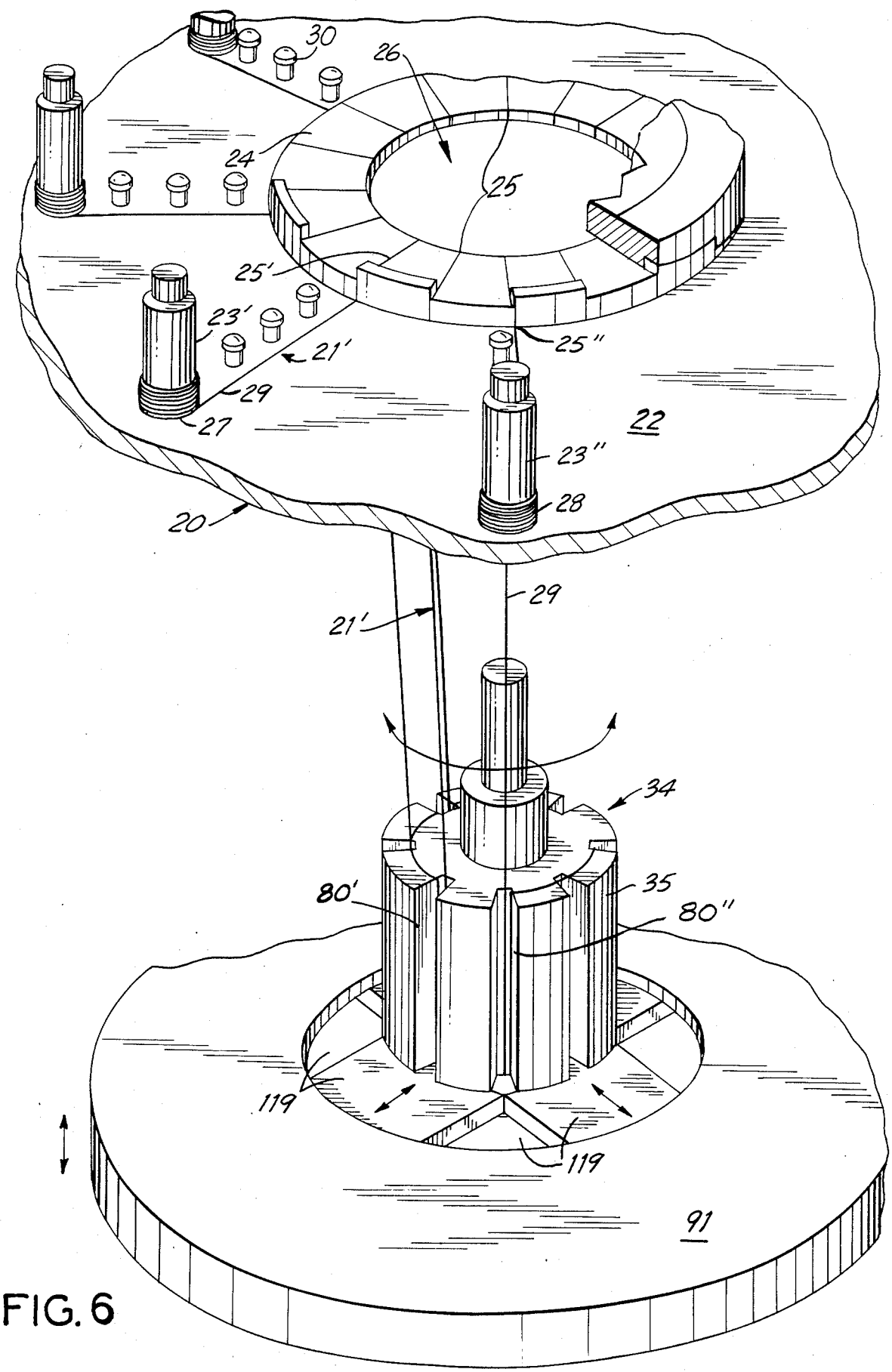
FIG. 6 is a perspective view of the lower blocker assembly blocking wire coils wound on an armature core.
Figure 9:
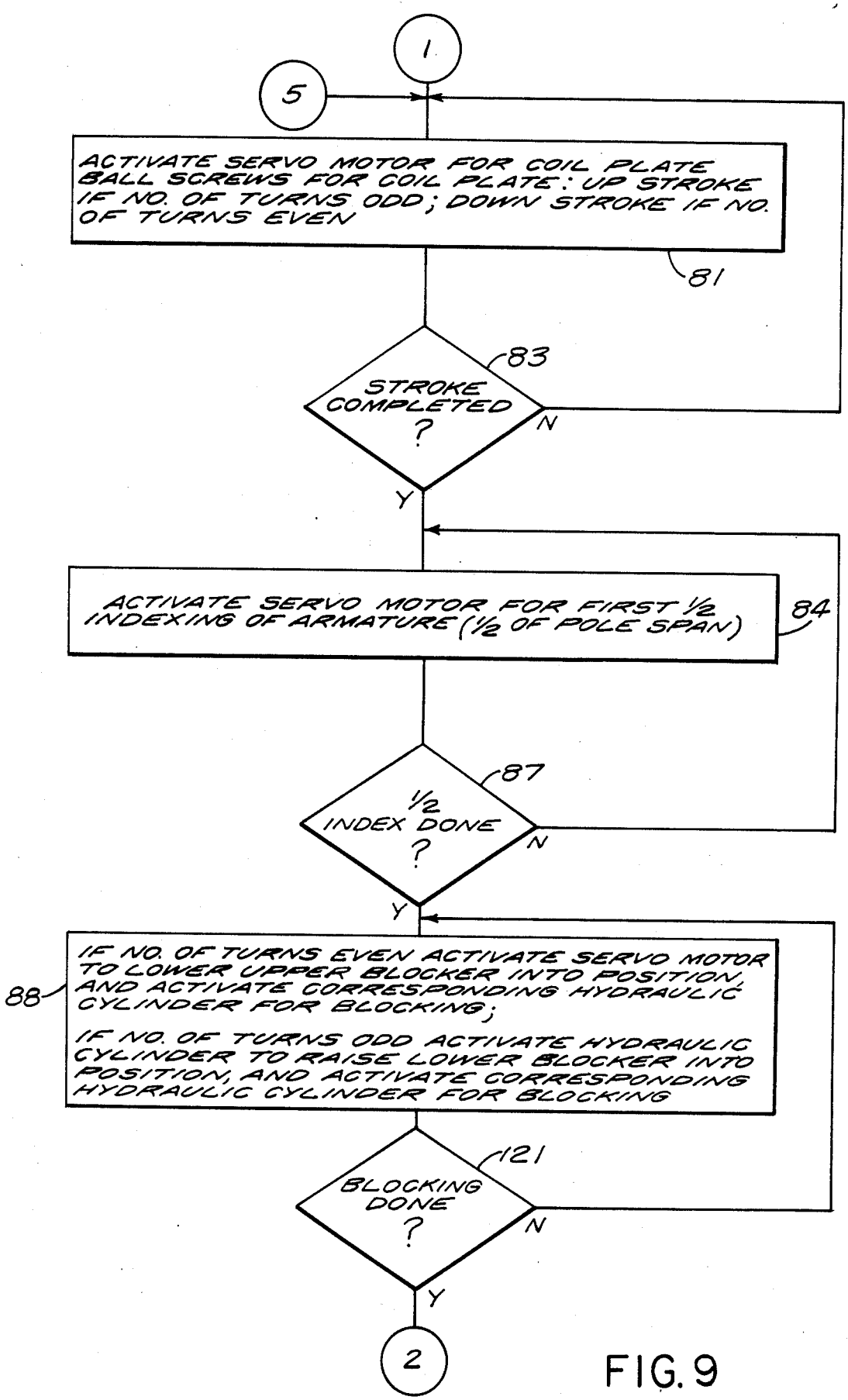
Figure 10:
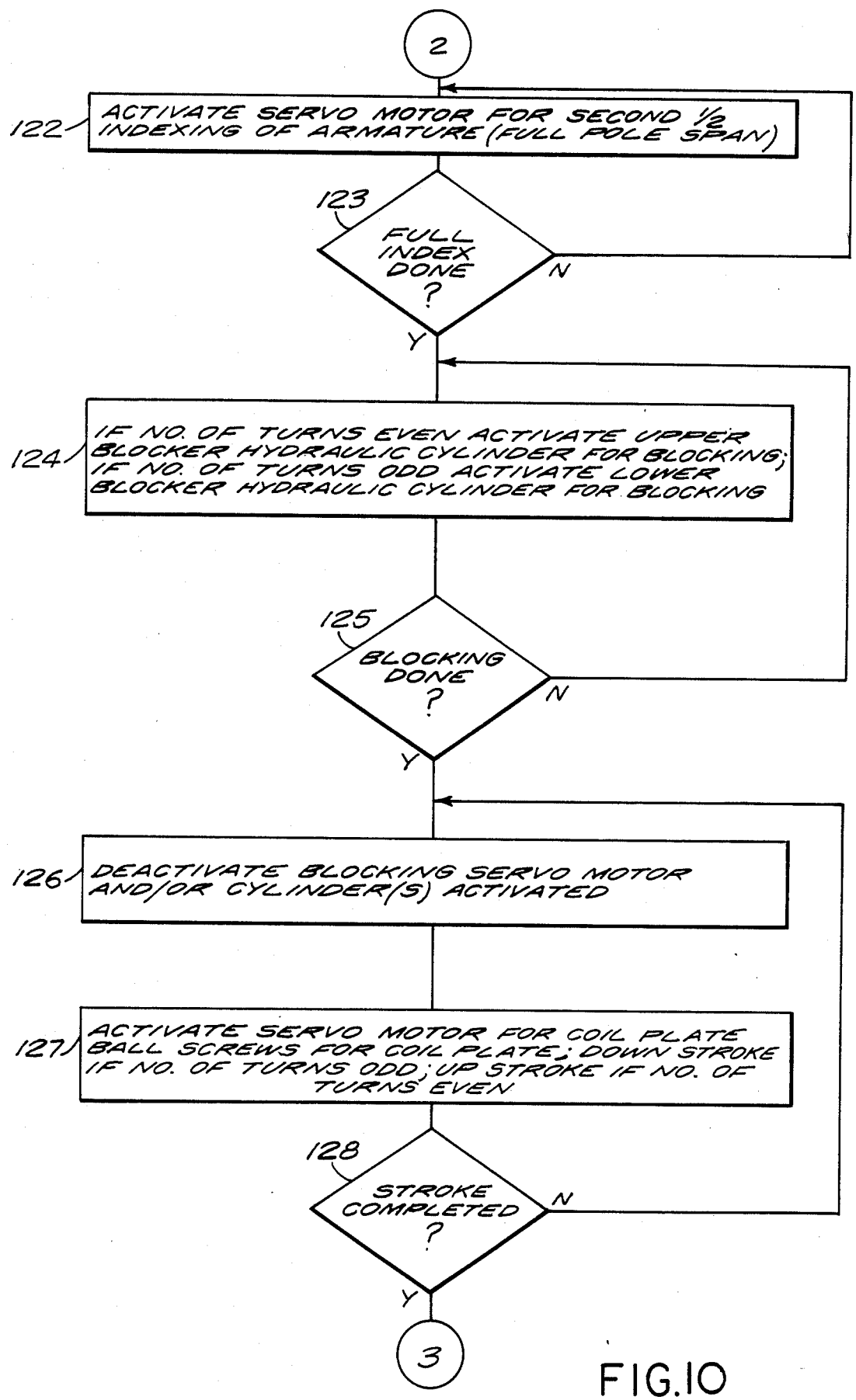
Figure 11:
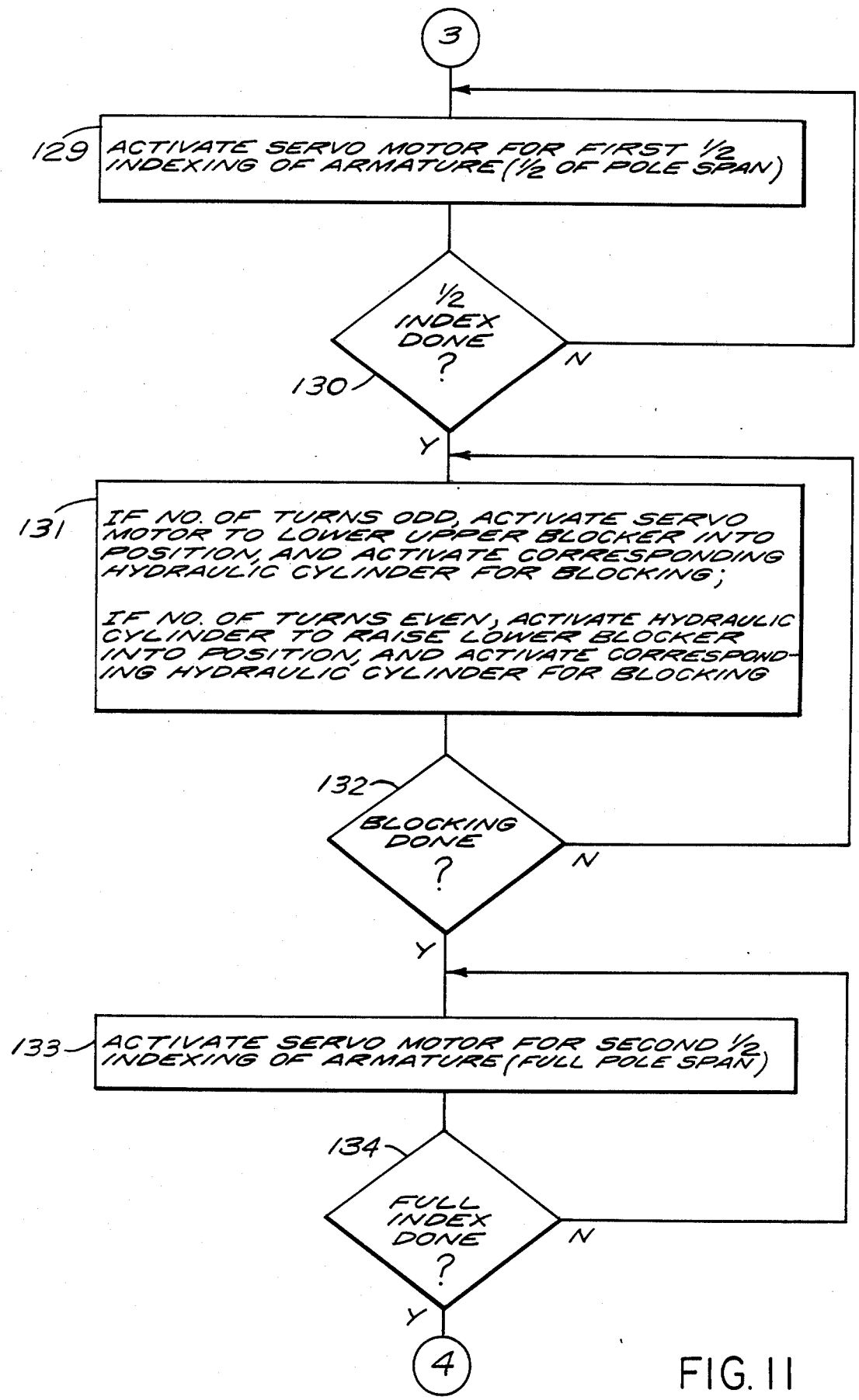
Figure 12:
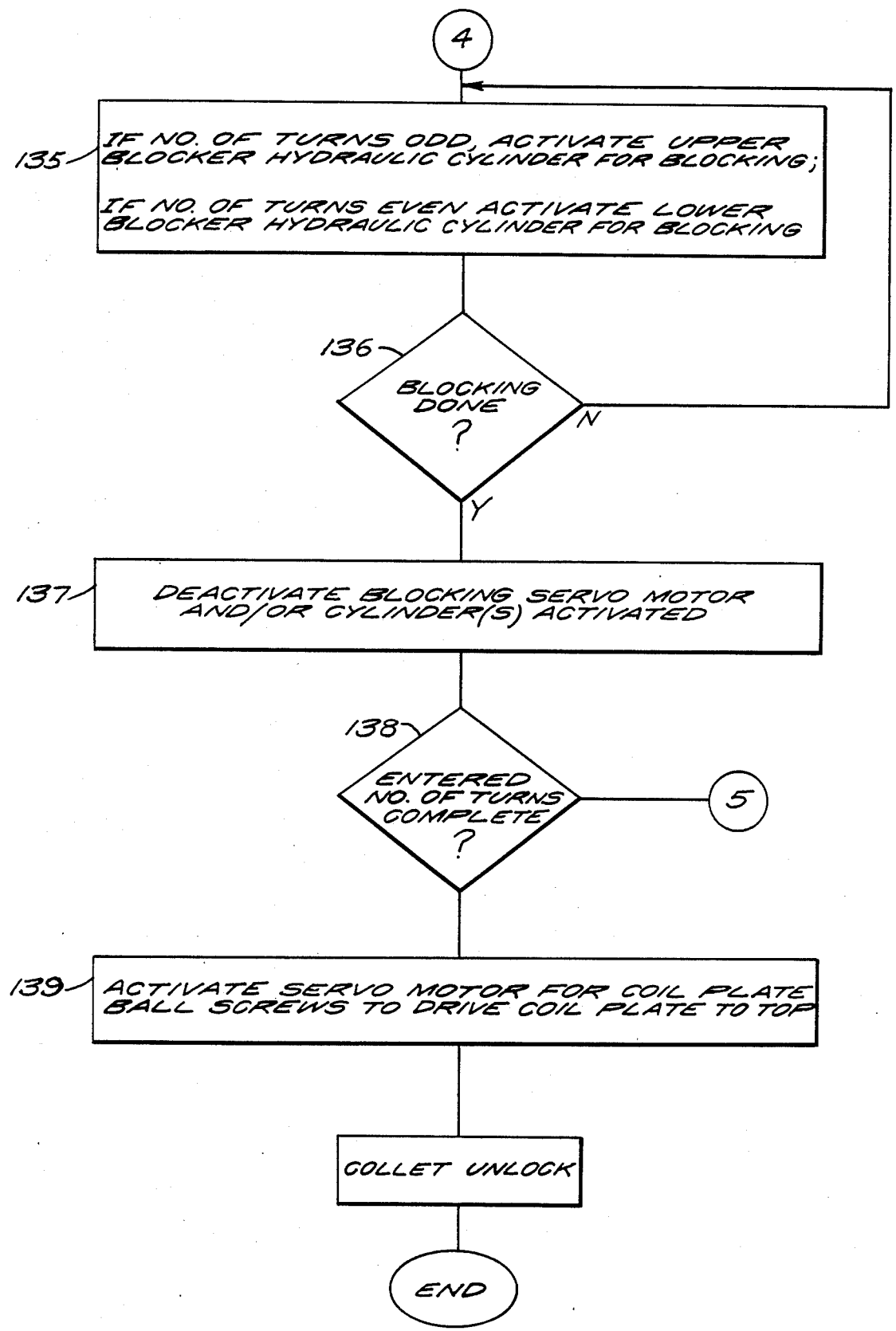

Referring now to FIG. 9, if both of these conditions are satisfied program flow falls through to step 81 whereupon the winding operation is begun. To illustrate the winding operation, the insertion of two wires into four slots of armature core 35 and the blocking thereof after a number of turns are illustrated in FIGS. 4 and 6 of the drawings. Beginning with FIG. 4 first, shown therein is armature 34 and armature core 35, which has a plurality of slots 80 positioned around the periphery thereof. Illustrated in phantom below armature 34 is coil transfer plate 20 shown in its initial position for winding an odd number of turns onto core 35. By way of example, loaded onto plate 20 is wire 21' to be would into core 35. Initially, wire 21' extends from coil 27 on pin 23' into winding area 26 through first slot 25', and out again through second slot 25" to coil 28 on pin 23" without contacting core 35.

The winding process is initiated by CPU 46 at step 81 of FIG. 9 activating coil plate servo motor 56 to rotate ball screws 58, and thereby, cause coil transfer plate 20, and therefore, wire guide rings 24 and 31, to translate with respect to armature core 35 to a second position above armature 34. This translation causes wire 21' to move through and into two slots 80' and 80" of core 35, simultaneously causing coils 27 and 28 to unwind and lengthen intermediate position 29.

Where slot insulating paper is used which is not glued into the slots of the armature core, a paper guide blade 32 of upper wire guide ring 31 would first engage the slot insulating paper to push it back prior to wire 21 entering slots 80' and 80". Thus, by way of example, where slot insulating paper 82 (FIG. 4) is not glued into slot 80''', blade 32', shown in section therein, would first engage insulating paper 82 as coil plate 20 moved from a lower to an upper position and a wire was placed into slot 80'''.

Figure 5:
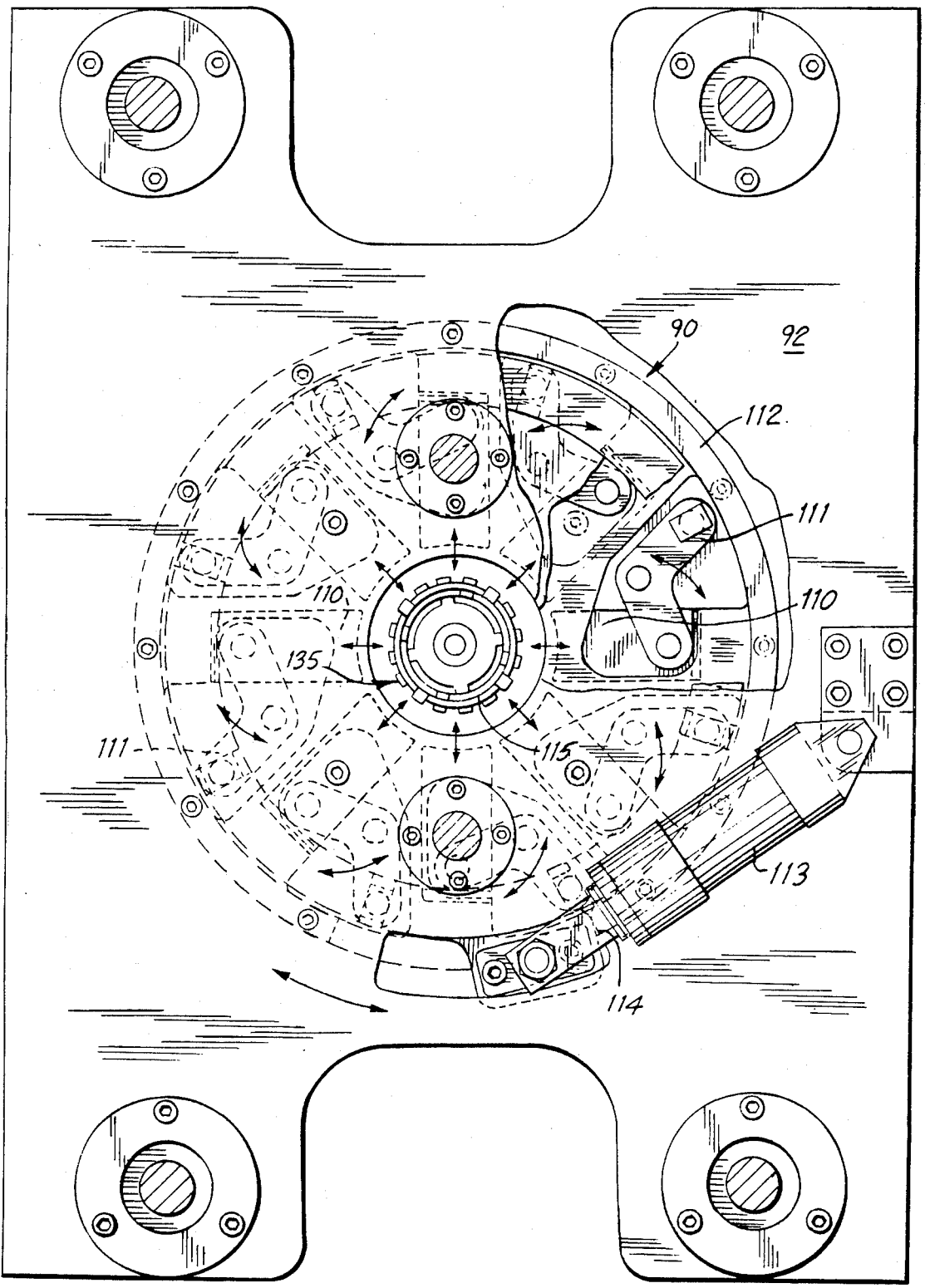
FIG. 5 is a plan view, partly in phantom, of the upper blocker assembly and its corresponding support plate.

Referring now to FIGS. 5, 6 and 9, upon completion of the upstroke (step 83) armature core 35 is then indexed, i.e., rotated, to achieve the proper coil span before a second turn is applied. This indexing is performed in two steps and is done in conjunction with a blocking operation which insures that previously inserted wires are pushed deep into their respective slots to make space for subsequent wires to be wound into the slots of the armature. Depending on the pole span to be used, armature core 35 is typically indexed by rotating it 60-90 degrees. In the preferred embodiment of the present invention, the repeatability of this indexing is within ±0.002 inches. It has been found that the blocking step helps to maximize slotfill, such that, for example, a level of 60-70% can be achieved in winding a four pole armature.

Referring now to step 84 of FIG. 9, armature core 35 is first rotated one-half the distance of the total pole span previously selected by CPU 46 activating collet-/index servo motor 42 through servo amp 47 and servo positioning unit 48. The distance which armature core 35 is rotated is determined by a measure of velocity and position, which are provided respectively, by a tach 85, mounted on the end of the shaft of motor 42, feeding a velocity signal back to servo amp 47, and an encoder 86, directly coupled to the shaft of motor 42, feeding a position signal back to servo positioning unit 48. Once armature core 34 has been indexed one-half of the selected pole span (step 87) program flow passes to step 88 to perform the blocking of the coil of wire previously inserted into the slots of the armature To perform the blocking function, the winding machine of the present invention is provided with two blocking assemblies, an upper blocking assembly 90, which is positioned by means of a DC servo motor controlled ball screw assembly, and a lower blocker assembly 91, which is positioned by means of a hydraulic cylinder. As shown in FIG. 3, upper blocker assembly 90 is bolted to the underside of a support plate 92 which in turn, has two ball screws 93 joined to its upper surface. Ball screws 93 each in turn are threaded through a lead screw assembly 94 mounted on support plate 53. Also position at the four corners of support plate 92 are four linear bearing assemblies 95, each of which also tracks one of linear bearing guide rods 61.

Controlling the rotation of ball screws 93 is a gear arrangement (not shown) driven by a DC servo motor 96, also activated by programmable controller 65 through a programmable relay 97 and a servo amplifier 98.

Positioning of upper blocker assembly 90 is measured by a tach 89 mounted on the end of the shaft of motor 96, and two end limit switches 99 and 99' positioned along the path which the upper blocker assembly traverses during the winding operation. Initially, assembly 90 is maintained in an inactive position 100 (shown in phantom) at the top of the machine. During operation of the machine it is moved to an intermediate position 101 until the completion of a down stroke in the winding operation, at which point it is brought into its active position 101' (shown in phantom) for blocking, the location of which depends on the size of the armature to be wound.

Lower blocker assembly 91 is translated into its active position by means of a hydraulic cylidner 102, also activated through a programmable relay 103 switched on and off by programmable controller 65. Here again, positioning of this assembly is determined by means of two end limit switches 104 and 104' positioned along the path which the assembly traverses. Hydraulic positioning is used with the lower blocker assembly because its active position is always the same, irrespective of the size of the armature to be wound. In contrast, a DC servo positioning arrangement is used with the upper blocker assembly because its active position varies in accordance with the size of the armature to be wound.

Although the mechanisms used to position the two blocker assemblies are different, the construction of the two blocker assemblies, themselves, is identical. Referring now to FIG. 5, shown therein is a plan view of upper blocker assembly 90 shown mostly in phantom because of its positioning below support plate 92. As shown in FIG. 5, this blocker assembly is comprised of a plurality of slidably mounted forming blocks 110 positioned on two tiers. Each is controlled by a plurality of cams 111 actuated simultaneously by a circular ring 112, rotated upon the activation of hydraulic cylinder 113. As can be seen from FIG. 5, upon the activation of cylinder 113 a drive rod 114 is translated, thereby causing ring 112 to be rotated clockwise, and in turn, each of cams 111 to be pivoted so as to cause its respective blocker 110 to translate radially inward in the direction of armature 34. When forming blocks 110 move radially in, they contact and cause coils 115, previously wound into the core 35 of armature 34 to be pushed further into the slots thereof, thereby providing additional room for subsequent turns that are to be inserted into the slots of armature core 35. Here again, blocking cylinder 113 is activated by a programmable relay 116, which, in turn, is activated by programmable controller 65 in response to instructions received from CPU 46.

The operation of lower blocking assembly 91 is identical to that of upper blocker assembly 90. A hydraulic cylinder 117, shown in FIG. 7, activated by a programmable relay 118 activated by controller 65, causes a plurality of blockers to push the coils previously wound onto core 35 to be pushed further into the slots thereof to make spaces for subsequent turns. As shown in FIG. 6, assembly 91 is moved into position by lower blocking cylinder 102 upon completion of an upstroke of coil plate 20. Upon reaching its active position, forming blocks 119, which are also disposed on two tiers, are caused to translate radially inward in the direction of armature core 35 by hydraulic cylinder 117.

Referring again to FIG. 9, after completing the first winding stroke with coil plate 20, if the number of turns to be wound is even, servo motor 96 is activated by programmable controller 65 to bring upper blocker assembly 90 into position to perform the blocking operation on the coils wire protruding from the upper side of armature core 35. Conversely, if the number of turns to be wound is odd, programmable controller 65 activates hydraulic cylinder 102 to raise lower blocker assembly 91 into position to perform the blocking operation on the coils of wire protruding from the lower side of armature core 35 (Step 88). Once this first blocking step is completed (Step 121), program flow passes to step 122 shown in FIG. 10, whereupon index servo motor 42 is again activated by CPU 46 to complete the second half of the indexing step to the full pole span selected. Once full indexing is completed (Step 123) the appropriate blocking assembly is again activated as indicated at Step 124, and upon its completion (Step 125), any previously activated servo motor and/or hydraulic cylinder is deactivated and allowed to return to its rest position (Step 126). Upon completion of the second blocking step, the winding stroke is repeated by moving the wires previously wound into the armature core back through the core by causing coil plate 20 to traverse in the opposite direction from that in the previous winding stroke. For this purpose, coil plate servo motor 56 is again activated by programmable controller 65 through servo amplifier 63 and programmable relay 64. (Step 127). Once the second winding stroke has been completed at Step 128, program flow passes to Step 129 shown in FIG. 11.

Upon completion of the second stroke, armature core 35 is again indexed by CPU 46 activating motor 42 to rotate armature core 35 a distance again equal to one-half of the total pole span. Upon completion of the first half of the indexing (Step 130), the appropriate blocking assembly is activated as indicated in Step 131 of FIG. 11. Here however, if the number of turns to be wound is odd, upper blocker assembly 90 is positioned and activated, while if the number of turns is even lower blocker assembly 91 is positioned and activated. Upon completion of this portion of the blocking function (Step 132) index servo motor 42 is again activated by CPU 46 to rotate armature core 35 a distance equal to the second half of the full pole span at Step 133. Once full indexing is completed at Step 134 program flow passes to Step 135 of FIG. 12 to again perform the blocking function by the appropriate blocking assembly. Again, upon completion of this portion of the blocking function (Step 136) the blocking servo motor and/or cylinders previously activated are all deactivated and returned to their rest positions at Step 137. At this point, CPU 46 accesses the previously entered winding data stored in RAM 71 to determine at Step 138 whether or not the required number of turns previously entered has been completed. The number of turns completed equals the number of strokes taken by coil transfer plate 20. If the number of turns performed is insufficient to satisfy the number of turns required program flow branches back to step 81 of FIG. 9 to complete the additional required strokes.

Where the required number of turns has been completed, program flow passes to Step 139 whereupon coil plate servo motor 56 is activated to drive ball screws 58 and thus coil transfer plate 20 up to a top rest position.

Figure 13:
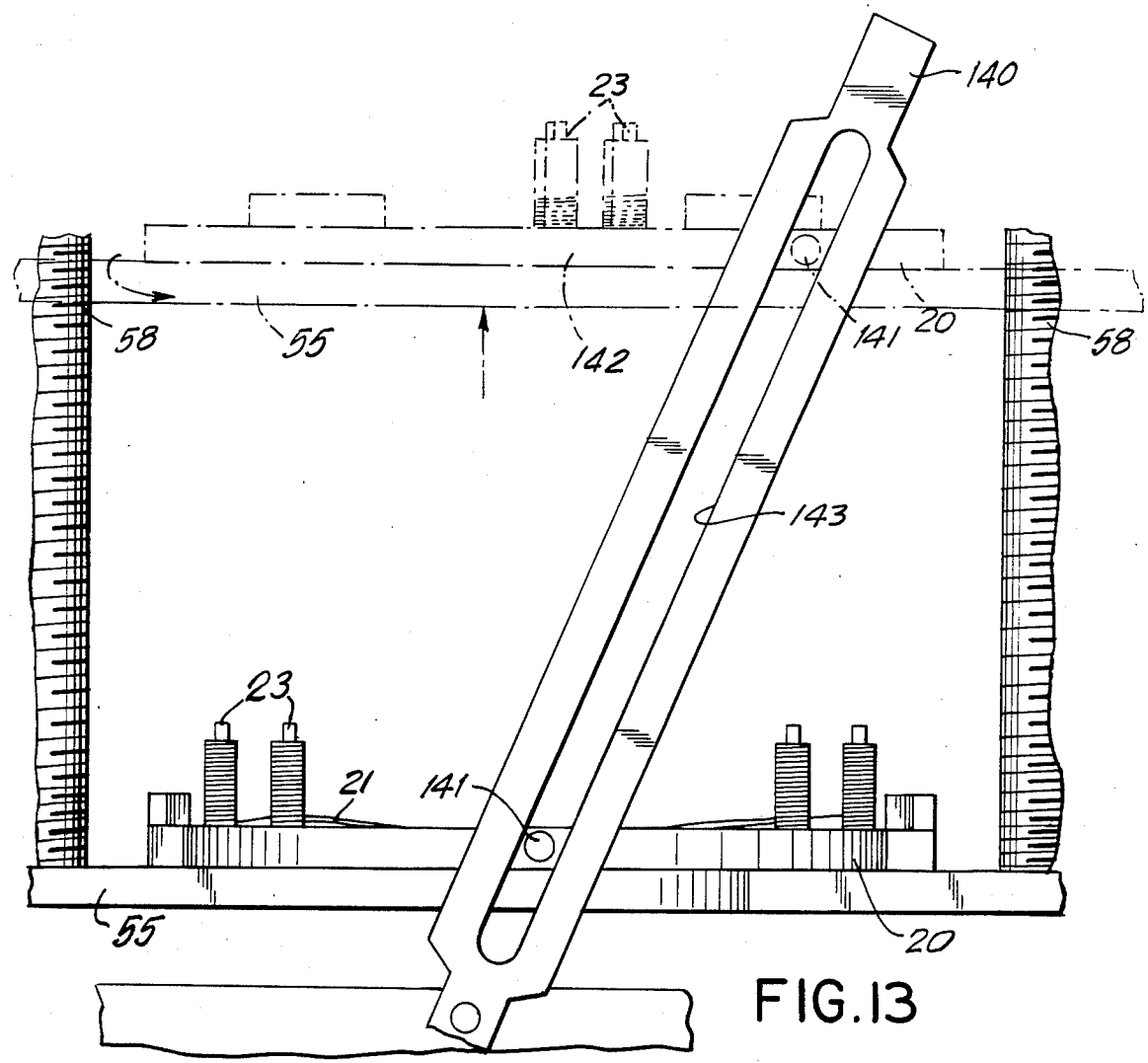
FIG. 13 is a side elevational view, partly in phantom, showing the operation of the skew cam used in winding skewed stack armatures.

The winding machine of the present invention may also be used to wind skewed stack armatures by adjusting a skew cam 140 (FIG. 13) rotatably mounted to the back of the machine to an angle corresponding to the skew angle of the armature core to be wound. For this purpose, coil plate 20, as shown in FIG. 13, has a cam follower 141 extending normally from its circumference 142 which is inserted into a cam track 143 in cam 140. Thus, as the machine performs a winding stroke which causes plate 20 to translate vertically, it simultaneously rotates counterclockwise or clockwise on support plate 55, depending upon the direction of translation, to track the skew angle of the armature core. The advantage of this is that no major retooling is required to wind skewed stack armatures.

The above described embodiment of the invention is illustrative, and modifications thereof may occur to those skilled in the art. The invention is not limited to the embodiment disclosed herein, however, it is limited only as defined by the appended claims.

What is claimed is:

1. An armature winding machine for winding an armature comprised of an armature core with a plurality of slots therein comprising:
    a collet assembly for mounting the armature in a substantially vertical orientation;
    a coil transfer plate removeably mounted on a support platform translatable with respect to the armature and in a substantially horizontal orientation, said coil transfer plate directing a plurality of coils of wire to a winding area,
    a first servo activated ball screw assembly for translating said translatable support platform along a path substantially paralllel to an axis of the armature so that said plurality of wires in said winding area move along the armature core,
    a wire guide assembly removeably mounted on said coil transfer plate adjacent said winding area with respect to the plurality of slots in the armature core so that each of said plurality of wires in the winding area is simultaneously inserted in two of said slots when said plurality of wires in the winding area move along the armature core,
    a servo activated gear assembly for rotating the armature a selected number of degrees so that the armature is indexed for a selected pole span,
    an upper blocker assembly disposed above the armature and comprised of a first plurality of forming blocks radially activatable for further inserting at the top of the armature core said inserted plurality of coils of wire to maximize slotfill,
    a second servo activated ball screw assembly, mounting said upper blocker assembly, for positioning said upper blocker assembly adjacent the top of the armature core,
    a lower blocker assembly disposed below the armature and comprised of a second plurality of forming blocks radially activatable for further inserting at the bottom of the armature core said inserted plurality of coils of wire to maximize slotfill, and
    a hydraulic drive, mounting said lower blocker assembly, for positioning said lower blocker assembly adjacent the bottom of the armature core.

2. An armature winding machine as recited in claim 1 further comprising a control circuit for controlling the operation of said first and second servo activated ball screw assemblies, said servo activated gear assembly and said hydraulic drive.

3. An armature winding machine as recited in claim 1 wherein said wire guide assembly further comprises a plurality of slot paper guides adjacent said winding area for pushing back slot paper in said slots to allow said plurality of wires in said winding aea to be inserted.

4. An armature winding machine as recited in claim 1 further comprising a plurality of wire guide assemblies, each assembly adapted to winding an armature core diameter.

5. An armature winding machine as recited in claim 1 whrein said servo actuated gear assembly is adapted to index the armature in half pole spans, and wherein said further inserting of said plurality of inserted wires is performed by said upper blocker assembly after each half pole span rotation.

6. An armature winding machine as recited in claims 1 or 2 wherein the slots of the armature are skewed, and wherein said armature winding machine further comprises a skew cam pivotably mounted adjacent said coil transfer plate and engaging a cam follower extending normally from said coil transfer plate so that said coil transfer plate rotates as it is translated, and thereby, said skewed slots of the armature are wound.

7. A method of winding an armature having a core with a plurality of slots therein comprising the steps of:
    directing a pluality of wires to a winding area,
    translating said plurality of wires directed to said winding areas axially with respect to the armature so that said plurality of wires in said winding area move along the armature core,
    guiding each of asid plurality of wires moving along the armature core into two of said plurality of slots simultaneously,
    rotating the armature core a selected number of degrees,
    inserting said plurality of wires guided into said plurality of slots further into said slots from a first end of the armature core after said plurality of guided wires are translated in a direction toward said first end, and
    further inserting said plurality of guided wires from a second end of the armature core after said plurality of guided wires are translated in a second direction, opposite said first direction and toward said second end to maximize space for subsequent wires to be guided into said slots, and
    repeating said foregoing step until a desired number of turns are wound into the armature core.

8. A method as recited in claim 7 wherein said step of rotating the armature is performed in half pole spans and wherein said step of further inserting said plurality of wires is performed after each half pole span rotation.

9. A method as recited in claim 7 wherein the slots of the armature core are skewed and wherein said step of translating said plurality of wires in said winding area axially with respect to the armature further comprises rotating said plurality of wires in said winding area as they are translated so that they are inserted into said skewed armature core slots.

* * * * *